June 27, 1933.  W. E. HOKE  1,915,789
METHOD OF AND DEVICE FOR FINISHING TAPER ROLLS
Filed Oct. 13, 1931    3 Sheets-Sheet 1

INVENTOR
W. E. Hoke
BY
ATTORNEY

June 27, 1933. W. E. HOKE 1,915,789
METHOD OF AND DEVICE FOR FINISHING TAPER ROLLS
Filed Oct. 13, 1931 3 Sheets-Sheet 2

INVENTOR
W. E. Hoke
BY
Joseph K. Schofield
ATTORNEY

June 27, 1933.  W. E. HOKE  1,915,789
METHOD OF AND DEVICE FOR FINISHING TAPER ROLLS
Filed Oct. 13, 1931  3 Sheets-Sheet 3
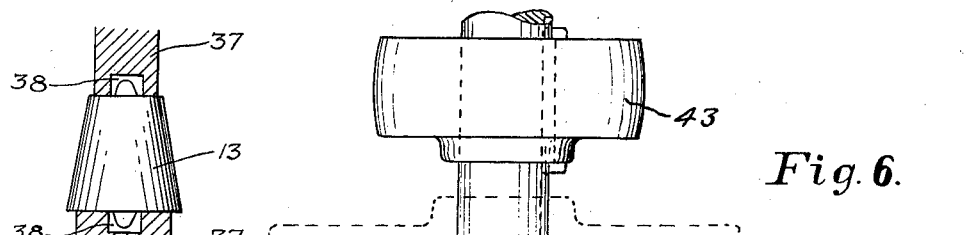
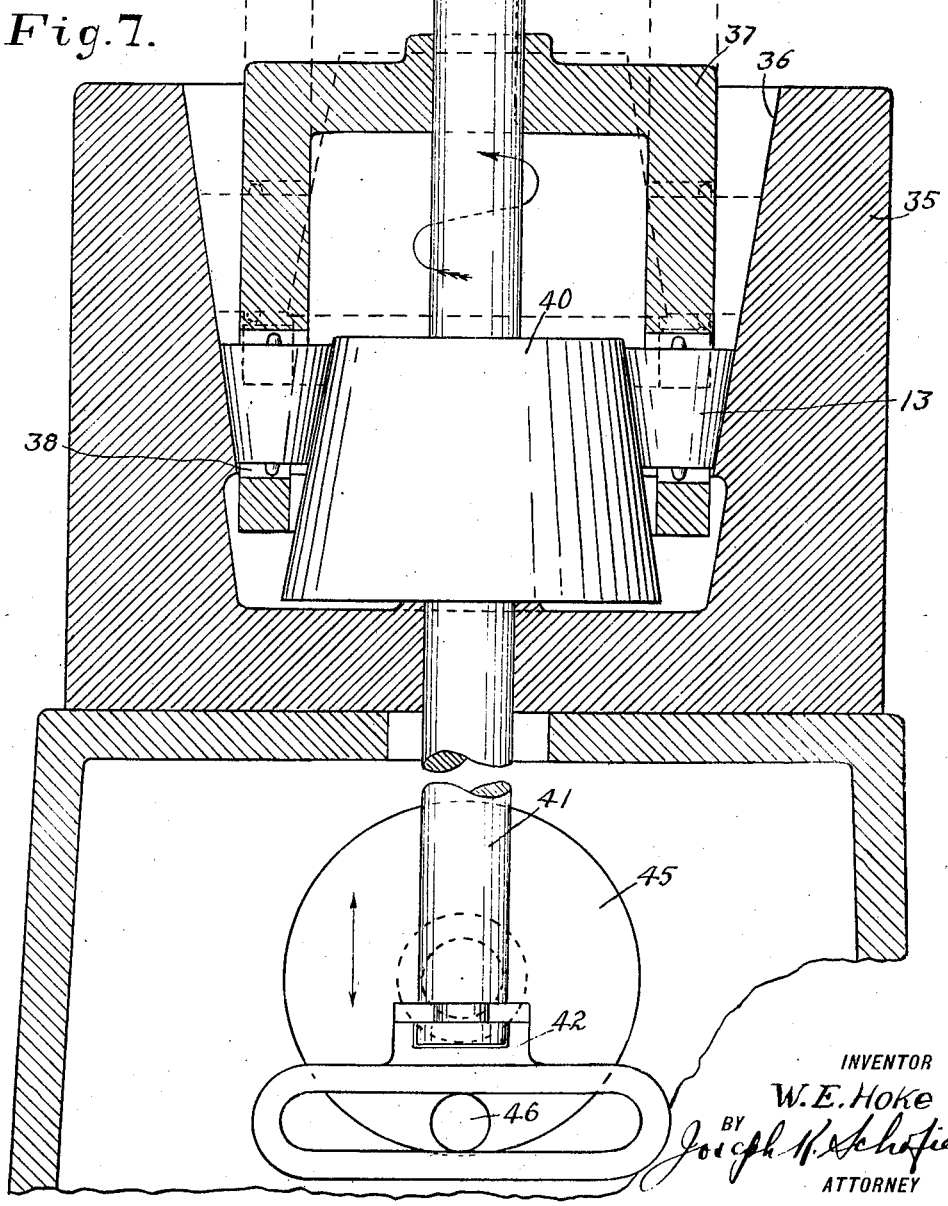
Fig. 7.
Fig. 6.
INVENTOR
W. E. Hoke
BY
ATTORNEY Patented June 27, 1933

1,915,789

UNITED STATES PATENT OFFICE

WILLIAM E. HOKE, OF BALTIMORE, MARYLAND

METHOD OF AND DEVICE FOR FINISHING TAPER ROLLS

Application filed October 13, 1931. Serial No. 568,634.

This invention relates to methods of lapping or otherwise finishing surfaces of revolution and to device within which the methods may be carried out. More particularly the invention relates to lapping or burnishing methods applicable to conical frustums such as are commonly employed as rollers in antifriction bearings, the operations being carried out simultaneously upon a plurality of rollers upon their conical surfaces and, in certain instances, upon their base surfaces.

An object of primary importance of the invention is to provide a rapid method of simultaneously finishing the conical surfaces of a plurality of rollers to an extremely high precision and uniformity, the base surfaces, or one of the end surfaces, of the rollers being also finished if desired.

A feature of importance of the invention is that the lapping or burnishing of the conical surfaces of the rollers is effected by their movement along elements of an internal cylindrical surface while pressed there-against during simultaneous rotation and revolving motion about this surface. Usually the pressure of the rollers against the lapping or burnishing surface is effected by pressure exerted against the end or base surfaces of the rollers.

Another feature that is important is that the rollers being finished are retained within a supporting member or holder in one or more annular series, the axes of the rollers being maintained in such positions that elements of their conical surfaces being finished will contact with elements of the cylindrical lapping or burnishing surface, and may be forced thereagainst.

Another object of the invention is to provide means to effect rotation of the rollers upon their own axes while being revolved about the lapping or burnishing surface, preferably by means of a central conical member rotated by any desired positive means, these means allowing the central conical member to move up and down with the supporting member.

And finally it is an object of the invention to provide reciprocating means for the supporting member to traverse the rollers over the lapping or burnishing surface which will permit free rotation thereof so that the rollers will be finished uniformly upon their conical surfaces.

With the above and other objects in view my invention includes the features of construction and methods of operation set forth in the following specification and illustrated in the accompanying drawings.

In the accompanying drawings annexed hereto and forming a part of this specification, I have shown my invention embodied in a simple form of lapping or burnishing device for small groups of conical rollers but it will be understood that the invention can be otherwise embodied and that the drawings are not to be construed as defining or limiting the scope of the invention, the claims appended to this specification being relied upon for that purpose.

In the drawings:

Fig. 6 is another modified form of device by means of which the invention may be carried out; and Fig. 7 is a detail in cross section of a portion of the retainer shown in Fig. 6 for the frustums being finished.

In the above mentioned drawings, I have shown several embodiments of the invention which are now deemed preferable, but it is to be understood that changes and modifications may be made within the scope of the appended claims without departing from the spirit of the invention.

Briefly, and in its preferred aspect, my invention may include and the novel method may be carried out in a device having the following principal parts: First, a fixed member provided with an internal cylindrical surface adapted to be charged with a suitable lapping or abrasive compound; second, a supporting member within which the work pieces are retained adapted to be reciprocated within said cylindrical surface and permitted to rotate, a series of rollers disposed in circular arrangement being mounted within this supporting member for rotation about their individual axes; third, a member having a conical surface pressing against the rollers and forcing them against the lapping surface; fourth, means to rotate this supporting member while permitting it to reciprocate with the supporting member; and fifth, means on the supporting member for retaining the rollers properly positioned during their rotary and reciprocatory movements to engage elements of the rollers with elements of the lapping member.

Figure 2:
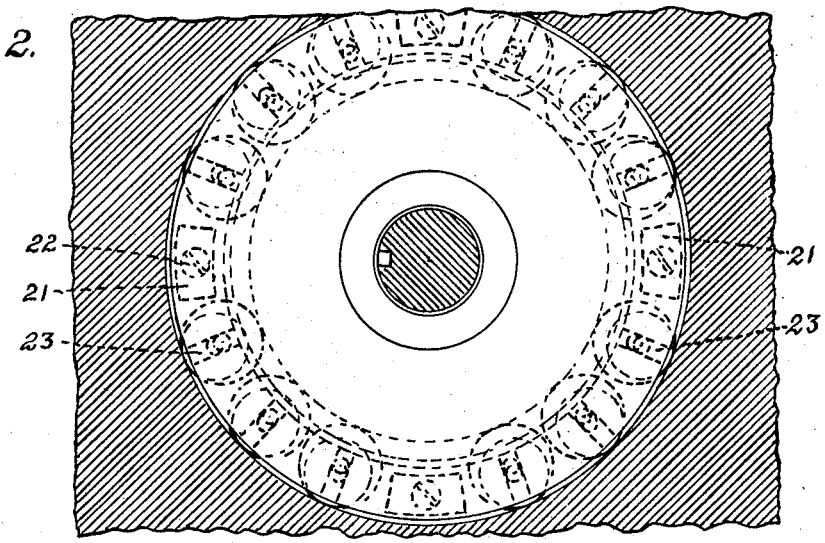
Fig. 2 is a plan view of the device shown in Fig. 1.
Figure 1:
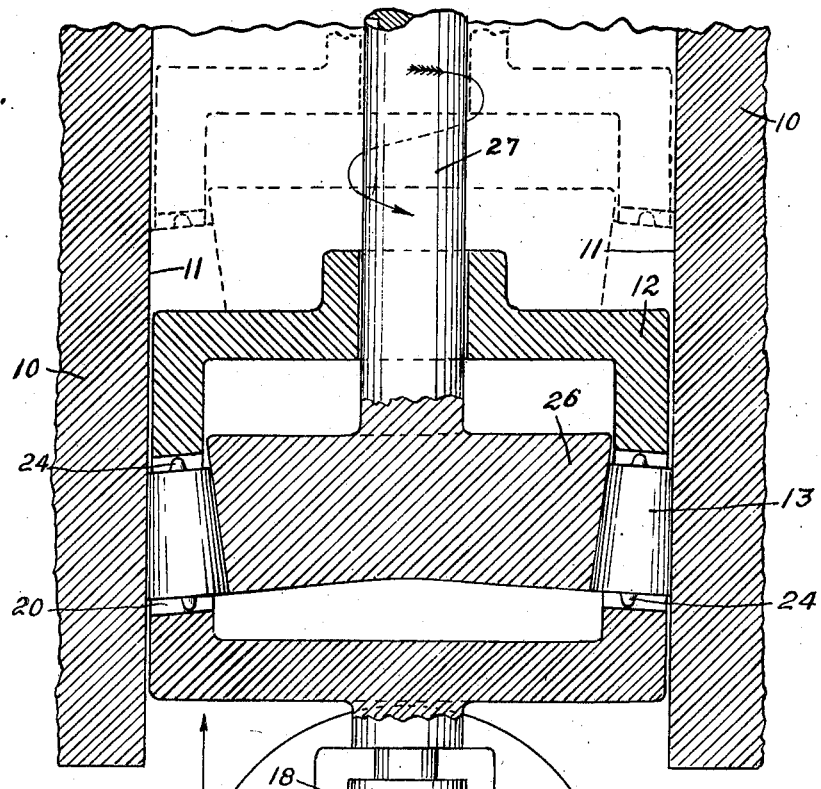
Figure 1 is a vertical sectional view of one form of device for practicing the invention.
Figure 5:
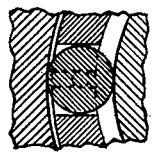
Fig. 5 is a fragmentary sectional view taken on the line 5—5 of Fig. 3.

Referring more in detail to the figures of the drawings, and first to Figs. 1 and 2, I provide a member in the form of a cylinder 10, the inner surface 11 of which may be charged with a suitable lapping or abrasive compound. This member 10 is adapted to be suitably supported in fixed position, its inner cylindrical surface 11 being carefully finished. Within this member 10 is adapted to operate a supporting member 12 for retaining a plurality of rollers 13 in proper positions to be lapped. This supporting member 12 is adapted to be reciprocated by any suitable means, the length of reciprocatory movement being sufficient to traverse the rollers 13 over the entire internal lapping surface 11 of the fixed member 10. The means to reciprocate the supporting member 12 may be of the form shown in Fig. 1 in which a pin 14 outstanding from a disk 15 is revolved about the axis of the disk on a shaft 16 carrying the disk. The pin 14 engages a transverse slot 17 in a member 18, the upper end of which engages a depending portion of the supporting member 12. The slotted member 18 engages the supporting member 12 so that the rotation of the supporting member 12 is permitted. By rotation of the shaft 16 and reciprocatory movement of the slotted member 18 the supporting member 12 for the rollers 13 being lapped may be moved up and down within the internal cylindrical lapping or burnishing surface 11 at any desired speed.

The supporting member 12 is provided with wide openings 20 through its wall, portions of the walls being retained to properly guide and retain the upper and lower portions forming the supporting member 12 in fixed relative position. The rollers 13 being finished extend through the walls and have their end or base surfaces in contact with the end surfaces of the cut-out portions 20. As the rollers 13 are tilted slightly while being finished these surfaces of the supporting member 12 are correspondingly formed to the proper slope.

The supporting member 12 for the rollers 13 may conveniently be made of two members, one member having extensions 21 passing between and forming the spaces within which the rollers 13 are disposed. The opposite member may be secured to the ends of the extensions 21 by means of screws 22.

In the embodiments of the invention illustrated the rollers are indicated as those employed in a standard form of tapered roller bearing. These rollers are provided with central extensions 24 from opposite ends. The base or end surfaces of the rollers 13 surrounding these projections may be and preferably are burnished or lapped simultaneously with the frustums. For that reason and for the purpose of maintaining the rollers 13 in proper position for finishing operations the upper and lower surfaces of the openings in the holding member 12 are grooved radially. These grooves are of such size that they easily accommodate the projections 24 on the rollers 13 and permit the end surfaces of the rollers to contact with and be lapped or burnished by the end walls of the openings in the holding member 12. These end surfaces of the rollers 13 may therefore be finished simultaneously with the conical surfaces. The rotation of the rollers about their individual axes effects lapping or burnishing of their end surfaces while reciprocatory movement of the holder 12 effects lapping or burnishing of the conical surfaces.

In order to prevent lateral tilting of the rollers 13 during operation any preferred means may be employed. With conical frustums having sufficiently wide bases no means may be necessary. I have shown, however, in Figs. 1 and 2 radial slots 23 cut into the upper and lower surfaces of the openings 20 formed in the supporting member 12. These slots 23 engage projections 24 axially extending from the opposite ends of the rollers 13 being finished. The rollers 13 are free while thus guided to move toward and from the lapping or burnishing surface 11 but are prevented from tilting laterally which would cause incorrect finishing of their conical surfaces. While supported between the radial slots 23 upon their axial projections 24 the positions of the slots being one directly above the other the rollers 13 contact with the finishing surface along elements of the cone of the rollers 13. These elements on the rollers 13 contact with elements of the cylindrical lapping or burnishing surface 11 so that the surfaces being finished on the rollers 13 will be true conical frustums.

The rollers 13 being finished are forced against the lapping or burnishing surface 11, the pressure exerted by the rollers thereagainst being determined by the weight of a member 26 engaging the rollers 13 upon their inner elements. Preferably and as shown this member 26 is in the form of a conical frustum on the lower end of a bar or shaft 27. The apex angle of this member is determined by the included apex angle of the rollers 13 so that the rollers will be held in proper position for lapping or burnishing their conical surfaces accurately.

This member 26 may be rotated at any desired speed by means drivingly connected to the shaft 27 as by means of the spline permitting reciprocatory movements of the member 26 with the rollers 13 and their supporting member 12. By being rotated and engaging the rollers 13 being finished, this inner member 26 serves as a driving member for the rollers assuring uniform rotation of the rollers about their axes and around the lapping or burnishing surface 11.

The combined effect of the rotation of the inner conical member 26 and the reciprocatory movement of the supporting member 12 is to traverse the rollers 13 about the entire surface 11 while they are rotating upon their individual axes and being revolved about the axis of the supporting member 12.

Figure 4:
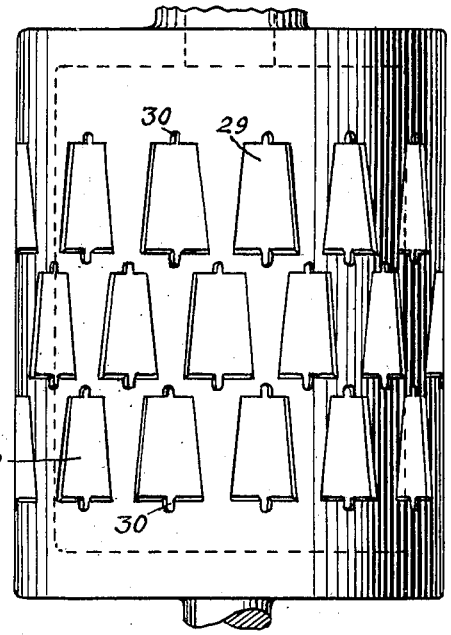
Fig. 4 is a side elevation of the holder or supporting member for the rollers shown in Fig. 3.
Figure 3:
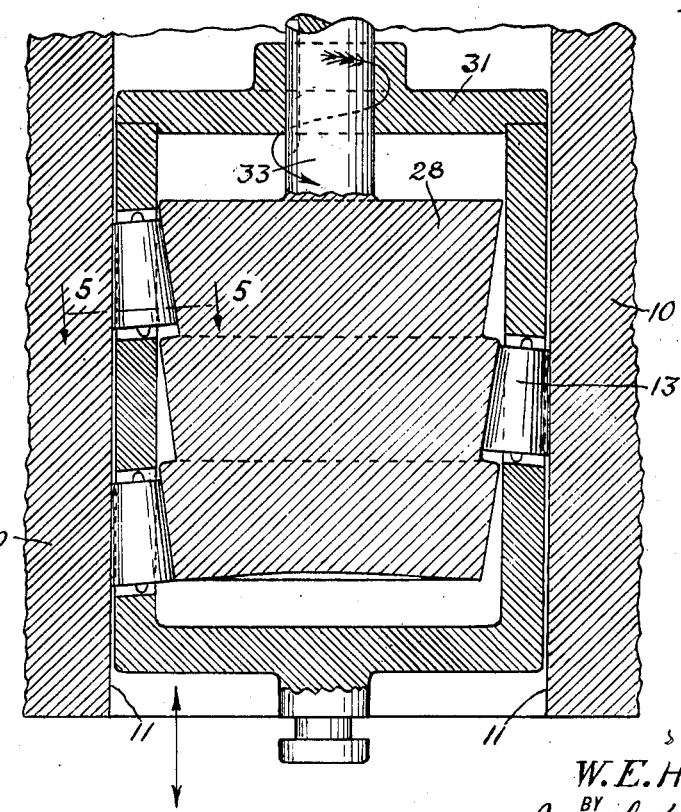
Fig. 3 is another form of the invention showing an arrangement for superposed annular series of rollers.

Referring now to the embodiment of the invention shown in Figs. 3 and 4 it will be seen that the fixed lapping member 10 is or may be similar to that shown in Figs. 1 and 2 but that the supporting member for the rollers 13 is materially changed. As shown in Fig. 4 the supporting member 28 is provided with a large number of individual openings 29 within its cylindrical surface within each of which a single roller 13 may be disposed. These openings 29 are shown as having radial grooves 30 within their upper and lower surfaces. For convenience this supporting member 28 may be made as shown with a cover portion 31 secured to the cylindrical portion. The cover portion may have a guide bearing within which rotates the shaft 33 for the inner member 28 for rotating the rollers 13 and for forcing them against the surface 11.

Referring to the modification of the invention shown in Fig. 6 it will be seen that the fixed lapping or burnishing member 35 has its operative surface 36 of internal conical form. The supporting member 37 for the rollers 13 is or may be formed with openings 38 about its periphery as in either the form shown in Figs. 1 and 2 or in Figs. 3 and 4. This supporting member 37 is adapted to rest with its own weight upon the upper ends of the rollers 13 being finished. Engaging the inner portions of the rollers is a conical member 40 which engages and forces the rollers 13 against the lapping surface 11 of the fixed member 10. This inner member 40 is adapted to be reciprocated by means similar to those shown in Figs. 1 and 2 for reciprocating the supporting member 12. These means include the rotatable connection between a shaft 41 for the member 40 and the reciprocating member 42 permitting rotation of this member 40 upon its axis. Also associated with this inner member 40 are rotating means, these being indicated as a pulley 43 suitably splined to an upper shaft 44 extended from the inner member 40. By simultaneously rotating the pulley 43 on the shaft 44 and also reciprocating the member 42 as by rotation of the disk 45 having a pin 46 outstanding therefrom engaging a slotted portion of member 42, the rollers 13 are rotated and traversed over the surface 36. During this operation the rollers 13 are pressed against the surface 36 by the weight of the member 37 within which they are supported.

It will be seen that in all embodiments of the invention the rollers 13 of slightly less than average size will not be forced into contact against the surfaces 11 or 36, as that pressure is determined by their engagement with the inner conical member 26, 28 or 40 and with the end surface of the opening formed in the retaining member for the rollers. The lapping or burnishing action will therefore be concentrated upon the rollers 13 of slightly larger size, therefore tending to uniformly finish each of the rollers of a group to a predetermined size and apex angle.

What I claim is:

1. The method of finishing conical rollers comprising mounting a plurality of rollers in an annular series in a supporting frame within a member having an internal surface, reciprocating said frame and rollers relative to said surface, and simultaneously rotating said rollers about their individual axes while forcing said rollers against said surface.

2. The method of finishing conical rollers comprising mounting a plurality of rollers in an annular series in a supporting frame within a member having an internal cylindrical surface, reciprocating said frame and rollers relative to said member, maintaining elements of said rollers in contact with said member parallel to the elements of the member engaged therewith, and simultaneously rotating and forcing said rollers against said member.

3. The method of finishing conical rollers comprising mounting a plurality of rollers in an annular series in a supporting frame within a cylindrical member, reciprocating said frame and rollers relative to said member, rotating a member having a conical surface contacting with said rollers to force said rollers against said member while causing said rollers to rotate, and maintaining said rollers within said supporting member with elements thereof in contact with elements of said member.

4. A device for finishing conical rollers comprising in combination, a member having an internal cylindrical surface, a supporting member for retaining an annular series of rollers in individually spaced positions, means to reciprocate said supporting member while permitting rotation thereof, and a member having an external conical surface engaging said rollers and forcing them against the internal cylindrical surface, and means to rotate said member having an external surface while permitting said member to reciprocate with said supporting member whereby said rollers are finished upon their conical surfaces while being continuously rotated on their axes and revolved within the member.

5. A device for finishing conical rollers comprising in combination, a member having an internal cylindrical surface, a supporting member for individually retaining rollers in position for movements relative to said member, means to reciprocate said supporting member to traverse said rollers along elements of said surface, a member having an external conical surface engaging said rollers and forcing them against said surface, means to rotate said external conical member during reciprocatory movements of said supporting member and rollers, said supporting member having individual guiding means permitting radial movements of said rollers while maintaining said rollers in position for finishing operations.

6. The method of finishing conical rollers comprising mounting a plurality of rollers in an annular series in a supporting frame within a member having an internal surface, reciprocating said frame and rollers relative to said surface, simultaneously rotating said rollers about their individual axes, and effecting pressure of said supporting frame against the end surfaces of said rollers to force said rollers against said surface.

7. The method of finishing conical rollers comprising mounting a plurality of rollers in an annular series in a supporting frame within a member having an internal surface, reciprocating said frame and rollers relative to said member while elements of said rollers contacting with said member are maintained parallel to the elements of the member engaged therewith, simultaneously rotating said rollers about their individual axes, and effecting pressure of said supporting frame against the end surfaces of said rollers to force said rollers against said internal surface, whereby said rollers will have their conical and end surfaces simultaneously finished.

In testimony whereof, I hereto affix my signature.

WILLIAM E. HOKE.